(12) United States Patent
Huizenga et al.

(10) Patent No.: US 8,364,325 B2
(45) Date of Patent: Jan. 29, 2013

(54) INTELLIGENCE IN DISTRIBUTED LIGHTING CONTROL DEVICES

(75) Inventors: Charles Huizenga, Berkeley, CA (US); Alex Do, Berkeley, CA (US)

(73) Assignee: Adura Technologies, Inc., San Francisco, CA (US)

( * ) Notice: Subject to any disclaimer, the term of this patent is extended or adjusted under 35 U.S.C. 154(b) by 0 days.

(21) Appl. No.: 12/156,621

(22) Filed: Jun. 2, 2008

(65) Prior Publication Data

US 2009/0299527 A1 Dec. 3, 2009

(51) Int. Cl.
*G05D 3/12* (2006.01)

(52) U.S. Cl. ........ 700/295; 700/291; 700/286; 700/258; 700/259; 315/153; 315/152

(58) Field of Classification Search .................. 700/295, 700/291, 258, 259, 286, 90; 455/4; 340/825.69; 315/152, 153
See application file for complete search history.

(56) References Cited

U.S. PATENT DOCUMENTS

| | | | | |
|---|---|---|---|---|
| 3,733,528 A | * | 5/1973 | Gilbreath | 315/291 |
| 3,735,141 A | * | 5/1973 | Beling | 315/159 |
| 4,242,614 A | * | 12/1980 | Vatis et al. | 315/153 |
| 4,323,820 A | | 4/1982 | Teich | |
| 4,347,461 A | * | 8/1982 | Carlson | 315/158 |
| 4,355,309 A | | 10/1982 | Hughey et al. | |
| 4,358,717 A | | 11/1982 | Elliott | |
| 4,388,567 A | * | 6/1983 | Yamazaki et al. | 315/291 |
| 4,454,509 A | | 6/1984 | Buennagel et al. | |
| 4,686,380 A | | 8/1987 | Angott | |
| 4,797,599 A | | 1/1989 | Ference et al. | |
| 4,889,999 A | * | 12/1989 | Rowen | 315/295 |
| 5,005,211 A | | 4/1991 | Yuhasz | |
| 5,146,153 A | | 9/1992 | Luchaco et al. | |
| 5,237,264 A | | 8/1993 | Moseley et al. | |
| 5,248,919 A | | 9/1993 | Hanna et al. | |
| 5,268,631 A | * | 12/1993 | Gorman et al. | 323/246 |
| 5,357,170 A | * | 10/1994 | Luchaco et al. | 315/159 |
| 5,373,453 A | | 12/1994 | Bae | |
| 5,471,063 A | | 11/1995 | Hayes et al. | |
| 5,561,351 A | | 10/1996 | Vrionis et al. | |
| 5,572,438 A | | 11/1996 | Ehlers et al. | |
| 5,637,930 A | | 6/1997 | Rowen et al. | |
| 5,770,926 A | | 6/1998 | Choi et al. | |
| 5,818,128 A | | 10/1998 | Hoffman et al. | |
| 5,822,012 A | | 10/1998 | Jeon et al. | |
| 5,872,429 A | | 2/1999 | Xia et al. | |

(Continued)

OTHER PUBLICATIONS

Adams, J.T., "Wireless Sensors and Controls Make the Organic Building", May 2006, Proceedings of the 2006 IEEE Intl Symposium on Electronics and the Environment, pp. 109-113.*

(Continued)

*Primary Examiner* — Mohammad Ali
*Assistant Examiner* — Kelvin Booker
(74) *Attorney, Agent, or Firm* — Carr & Ferrell LLP (57) ABSTRACT

Exemplary systems, methods, and apparatuses for distributed intelligence in facility lighting control are provided. A facility lighting system may be organized into multiple control areas, each of which may include one or more component devices. Each lighting control area may be associated with a control apparatus, which controls the operation of the lighting devices of the associated control area based on various types of signal information. Signal information may include information concerning local conditions or environments, as well as information from a centralized control server. Some embodiments further include monitoring the operation and predicting fault states of the lighting control area.

23 Claims, 3 Drawing Sheets

U.S. PATENT DOCUMENTS

| | | | |
|---|---|---|---|
| 5,905,442 A | 5/1999 | Mosebrook et al. | |
| 5,909,087 A | 6/1999 | Bryde et al. | |
| 5,927,603 A | 7/1999 | McNabb | |
| 5,962,989 A * | 10/1999 | Baker | 315/294 |
| 5,982,103 A | 11/1999 | Mosebrook et al. | |
| 6,025,783 A | 2/2000 | Steffens, Jr. | |
| 6,044,062 A | 3/2000 | Brownrigg et al. | |
| 6,100,653 A | 8/2000 | Lovell et al. | |
| 6,148,306 A * | 11/2000 | Seidl et al. | 707/999.104 |
| 6,169,377 B1 | 1/2001 | Bryde et al. | |
| 6,175,860 B1 | 1/2001 | Gaucher | |
| 6,184,622 B1 | 2/2001 | Lovell et al. | |
| 6,249,516 B1 | 6/2001 | Brownrigg et al. | |
| 6,252,358 B1 | 6/2001 | Xydis et al. | |
| 6,297,724 B1 | 10/2001 | Bryans et al. | |
| 6,300,727 B1 | 10/2001 | Bryde et al. | |
| 6,301,674 B1 | 10/2001 | Saito et al. | |
| 6,311,105 B1 | 10/2001 | Budike | |
| 6,388,399 B1 * | 5/2002 | Eckel et al. | 315/312 |
| 6,400,280 B1 | 6/2002 | Osakabe | |
| 6,504,266 B1 | 1/2003 | Ervin | |
| 6,510,369 B1 | 1/2003 | Lacy | |
| 6,535,859 B1 * | 3/2003 | Yablonowski et al. | 705/412 |
| 6,548,967 B1 | 4/2003 | Dowling et al. | |
| 6,633,823 B2 * | 10/2003 | Bartone et al. | 702/57 |
| 6,640,142 B1 * | 10/2003 | Wong et al. | 700/28 |
| 6,689,050 B1 | 2/2004 | Beutter et al. | |
| 6,700,334 B2 | 3/2004 | Weng | |
| 6,803,728 B2 | 10/2004 | Balasubramaniam et al. | |
| 6,891,838 B1 | 5/2005 | Petite et al. | |
| 6,904,385 B1 | 6/2005 | Budike, Jr. | |
| 6,914,395 B2 | 7/2005 | Yamauchi et al. | |
| 6,914,893 B2 | 7/2005 | Petite | |
| 6,927,546 B2 | 8/2005 | Adamson et al. | |
| 6,990,394 B2 | 1/2006 | Pasternak | |
| 7,006,768 B1 | 2/2006 | Franklin | |
| 7,039,532 B2 | 5/2006 | Hunter | |
| 7,042,170 B2 | 5/2006 | Vakil et al. | |
| 7,045,968 B1 | 5/2006 | Bierman et al. | |
| 7,054,271 B2 | 5/2006 | Brownrigg et al. | |
| 7,079,808 B2 | 7/2006 | Striemer | |
| 7,103,511 B2 | 9/2006 | Petite | |
| 7,167,777 B2 | 1/2007 | Budike, Jr. | |
| 7,199,530 B2 | 4/2007 | Vakil et al. | |
| 7,233,080 B2 | 6/2007 | Garnault et al. | |
| 7,263,073 B2 | 8/2007 | Petite et al. | |
| 7,274,975 B2 | 9/2007 | Miller | |
| 7,307,389 B2 | 12/2007 | Vakil et al. | |
| 7,307,542 B1 | 12/2007 | Chandler et al. | |
| 7,333,880 B2 | 2/2008 | Brewster et al. | |
| 7,339,466 B2 | 3/2008 | Mansfield et al. | |
| 7,346,433 B2 | 3/2008 | Budike | |
| 7,349,766 B2 | 3/2008 | Rodgers | |
| 7,352,972 B2 | 4/2008 | Franklin | |
| 7,354,175 B2 | 4/2008 | Culbert et al. | |
| 7,356,308 B2 | 4/2008 | Hamada et al. | |
| 7,369,060 B2 | 5/2008 | Veskovic et al. | |
| 7,400,226 B2 | 7/2008 | Barrieau et al. | |
| 7,417,556 B2 | 8/2008 | Ling | |
| 7,432,803 B2 | 10/2008 | Fails et al. | |
| 7,446,671 B2 | 11/2008 | Giannopoulos et al. | |
| 7,490,957 B2 | 2/2009 | Leong et al. | |
| 7,491,111 B2 | 2/2009 | Ghaly | |
| 7,528,503 B2 | 5/2009 | Rognli et al. | |
| 7,561,977 B2 | 7/2009 | Horst et al. | |
| 7,565,227 B2 | 7/2009 | Richard et al. | |
| 7,571,063 B2 | 8/2009 | Howell et al. | |
| 7,599,764 B2 | 10/2009 | Matsuura et al. | |
| 7,606,639 B2 | 10/2009 | Miyaji | |
| 7,623,042 B2 | 11/2009 | Huizenga | |
| 7,650,425 B2 | 1/2010 | Davis et al. | |
| 7,659,674 B2 | 2/2010 | Mueller et al. | |
| 7,677,753 B1 | 3/2010 | Wills | |
| 7,697,927 B1 | 4/2010 | Owens | |
| 7,706,928 B1 * | 4/2010 | Howell et al. | 700/295 |
| 7,719,440 B2 | 5/2010 | Delp et al. | |
| 7,755,505 B2 | 7/2010 | Johnson et al. | |
| 7,760,068 B2 | 7/2010 | Hatemata et al. | |
| 7,783,188 B2 | 8/2010 | Clark | |
| 7,812,543 B2 | 10/2010 | Budike, Jr. | |
| 7,839,017 B2 | 11/2010 | Huizenga et al. | |
| 7,843,353 B2 | 11/2010 | Pan et al. | |
| 7,860,495 B2 | 12/2010 | McFarland | |
| 7,880,394 B2 | 2/2011 | Sibalich et al. | |
| 7,889,051 B1 | 2/2011 | Billig et al. | |
| 7,902,759 B2 | 3/2011 | Newman, Jr. | |
| 7,925,384 B2 | 4/2011 | Huizenga | |
| 2001/0025349 A1 | 9/2001 | Sharood et al. | |
| 2002/0043938 A1 | 4/2002 | Lys | |
| 2003/0020595 A1 | 1/2003 | Wacyk | |
| 2003/0209999 A1 | 11/2003 | Hui et al. | |
| 2004/0002792 A1 * | 1/2004 | Hoffknecht | 700/295 |
| 2004/0051467 A1 | 3/2004 | Balasubramaniam et al. | |
| 2004/0100394 A1 | 5/2004 | Hitt | |
| 2005/0043862 A1 | 2/2005 | Brickfield et al. | |
| 2005/0090915 A1 * | 4/2005 | Geiwitz | 700/90 |
| 2005/0234600 A1 | 10/2005 | Boucher et al. | |
| 2006/0044152 A1 * | 3/2006 | Wang | 340/825 |
| 2006/0142900 A1 * | 6/2006 | Rothman et al. | 700/295 |
| 2006/0215345 A1 | 9/2006 | Huizenga | |
| 2006/0291136 A1 | 12/2006 | Okishima | |
| 2007/0005195 A1 | 1/2007 | Pasquale et al. | |
| 2007/0085700 A1 * | 4/2007 | Walters et al. | 340/870.02 |
| 2007/0090960 A1 | 4/2007 | Miki | |
| 2007/0271006 A1 | 11/2007 | Golden et al. | |
| 2007/0273307 A1 * | 11/2007 | Westrick et al. | 315/312 |
| 2007/0276547 A1 | 11/2007 | Miller | |
| 2008/0071391 A1 * | 3/2008 | Busby et al. | 700/12 |
| 2008/0133065 A1 | 6/2008 | Cannon et al. | |
| 2008/0167756 A1 | 7/2008 | Golden et al. | |
| 2008/0242314 A1 * | 10/2008 | McFarland | 455/456.1 |
| 2008/0258633 A1 * | 10/2008 | Voysey | 700/17 |
| 2008/0281473 A1 | 11/2008 | Pitt | |
| 2009/0018706 A1 | 1/2009 | Wittner | |
| 2009/0026966 A1 | 1/2009 | Budde et al. | |
| 2009/0045941 A1 | 2/2009 | Cooper | |
| 2009/0048691 A1 * | 2/2009 | Donaldson | 700/90 |
| 2009/0055032 A1 | 2/2009 | Rodgers | |
| 2009/0063257 A1 | 3/2009 | Zak et al. | |
| 2009/0066473 A1 | 3/2009 | Simons | |
| 2009/0072945 A1 * | 3/2009 | Pan et al. | 340/5.1 |
| 2009/0132070 A1 | 5/2009 | Ebrom et al. | |
| 2009/0198384 A1 | 8/2009 | Ahn | |
| 2009/0218951 A1 | 9/2009 | Weaver | |
| 2009/0240381 A1 | 9/2009 | Lane | |
| 2009/0243517 A1 | 10/2009 | Verfuerth et al. | |
| 2009/0248217 A1 * | 10/2009 | Verfuerth et al. | 700/295 |
| 2009/0261735 A1 | 10/2009 | Sibalich et al. | |
| 2009/0262189 A1 * | 10/2009 | Marman | 348/143 |
| 2009/0267540 A1 | 10/2009 | Chemel et al. | |
| 2009/0278472 A1 | 11/2009 | Mills et al. | |
| 2009/0292402 A1 | 11/2009 | Cruickshank | |
| 2009/0292403 A1 | 11/2009 | Howell et al. | |
| 2009/0299527 A1 | 12/2009 | Huizenga | |
| 2010/0039240 A1 | 2/2010 | Rodriguez et al. | |
| 2010/0052939 A1 | 3/2010 | Liang | |
| 2010/0066267 A1 | 3/2010 | Meyer | |
| 2010/0114340 A1 | 5/2010 | Huizenga et al. | |
| 2010/0134019 A1 | 6/2010 | Berhorst | |
| 2010/0134051 A1 | 6/2010 | Huizenga et al. | |
| 2010/0141153 A1 | 6/2010 | Recker | |
| 2010/0164386 A1 | 7/2010 | You | |
| 2010/0179670 A1 | 7/2010 | Forbes, Jr. et al. | |
| 2010/0185339 A1 | 7/2010 | Huizenga et al. | |
| 2010/0191388 A1 | 7/2010 | Huizenga et al. | |
| 2010/0201203 A1 | 8/2010 | Schatz et al. | |
| 2010/0204847 A1 | 8/2010 | Leete, III et al. | |
| 2010/0207548 A1 | 8/2010 | Lott | |
| 2010/0237783 A1 | 9/2010 | Dupre et al. | |
| 2010/0265100 A1 | 10/2010 | Jalbout et al. | |
| 2011/0006877 A1 | 1/2011 | Franklin | |
| 2011/0012541 A1 | 1/2011 | Finch | |
| 2011/0043052 A1 | 2/2011 | Huizenga et al. | |
| 2011/0101871 A1 | 5/2011 | Schenk et al. | |
| 2011/0109424 A1 | 5/2011 | Huizenga et al. | |
| 2011/0112702 A1 | 5/2011 | Huizenga et al. | |

OTHER PUBLICATIONS

Canovas, S. R., Chermont, M.G., and Cugnasca, C.E., "Remote Monitoring and Actuation Based on LonWorks® Technology", Jul. 2005, 2005 EFITA/WCCA Joint Congress on IT in Agriculture.*

Gislason, D. and Gillman, T., "ZigBee Wireless Sensor Networks", Nov. 2004, Dr. Dobbs online journal, www.ddj.com/184405887.*

Gutierrez, J.A., "On the Use of IEEE Std 802.15.4 to enable Wireless Sensor Netwoks in Building Automation", Dec. 2007, Intl Journal of Wireless Information Network, vol. 14, No. 4.*

Kintner-Meyer, M., "Opportunities of Wireless Sensors and Controls for Building Operations", Aug.-Sep. 2005, Energy Engineering, vol. 102, No. 5, pp. 27-48.*

Motegi, N., Piette, M., Kinney, S., and Herter, K., Web-based energy information systems for energy management and demand response in commercial buildings, Apr. 2003, Lawrence Berkeley National Laboratory.*

Park, H., Burke, J., and Srivastava, M., "Design and Implementation of a Wireless Sensor Network for Intelligent Light Control", Apr. 2007, IPSN 07'.*

Sandhu, J.S.S., Agogino, A.M., "Wireless Sensor Networks for Commercial Lighting Conrol: Decision Making with Multi-Agent Systems", Jul. 2004, Workshop on Sensor Networks.*

Sandhu, J.S., Agogino, A.M., and Agogino, A.K., Wireless Sensor Networks for Commercial Lighting Control: Decision Making with Multi-agent Systems, 2004, American Association for Artificial Intelligence.*

Sekinger, J., "Wireless Lighting Control Technology", Oct. 2005, Phillips NAESCO Midwest Regional Mtgs.*

Singhvi, V., Krause, A, Guestrin, C., Garrett, J.H., Matthews, H.S., "Intelligent Light Control Usine Sensor Networks", Nov. 2005, SenSys 2005.*

Teasdale, D Rubinstein, F., Watson, D., and Purdy, S., "Annual Technical Progress Report:'Adapting Wireless Technology to Lighting Control and Environmental Sensing", Oct. 2005, Dust Networks, Annual Technical Progress Report.*

Wang, D. Arens, E., and Federspiel, C., "Opportunities to same energy and improve comfort by using wireless sensor networks in buildings", Oct. 2003, Proceedings of the third Intl Conference for Enhanced Building Operations.*

U.S. Appl. No. 11/376,620, Charles A. Huizenga, Wireless Network Control for Building Lighting System, filed Mar. 14, 2006.

U.S. Appl. No. 12/380,727, Charles A. Huizenga, Systems and Methods for Remotely Controlling an Electrical Load, filed Mar. 2, 2009.

U.S. Appl. No. 12/912,717, Charles Huizenga, Sensor Interface for Wireless Control, filed Oct. 26, 2010.

U.S. Appl. No. 12/940,902, Charles Huizenga, Wireless Sensor, filed Nov. 5, 2010.

U.S. Appl. No. 12/913,725, Charles Huizenga, Systems and Methods for Remotely Controlling an Electrical Load, filed Oct. 27, 2010.

* cited by examiner

INTELLIGENCE IN DISTRIBUTED LIGHTING CONTROL DEVICES

BACKGROUND OF THE INVENTION

1. Field of the Invention

The present invention relates to facilities management. More specifically, the present invention relates to distributed intelligence in lighting control.

2. Description of Related Art

Various resources are provided to an area by facilities systems. Facilities systems may encompass lighting systems, HVAC systems, security systems, fire/safety systems, irrigation systems, agricultural wind systems, blind/louver systems, and the like. The area receiving the resources from facilities systems may include a building, a floor, a room, a group of buildings, etc. Depending on the area, the resources provided, and specific occupant requirements, such facilities systems may include multiple devices of various types. For example, a lighting system for a large building may include several types of lights in various configurations distributed throughout multiple rooms, on multiple floors, etc.

One possible way to manage a facilities system is to provide centralized control of all the devices in such a system. Centralization may allow an individual, such as a facilities manager, to control all the devices of the facilities system from one or a few control interfaces. For example, the facilities manager can turn on all of the lights and/or turn off all of the lights remotely and without having to physically flick each switch on and off in each room. Some disadvantages to a highly centralized control system may include implementation difficulties and inefficiencies. For example, it may be difficult and/or costly to retrofit a large area with a centralized control system.

Centralized control of a facilities system having multiple devices may also be complicated by various factors. For instance, some devices in the system may be subject to different demands than other devices in the system. Using the above example, the lighting system may need to provide more light in certain rooms that do not receive as much natural sunlight as other rooms. As such, high centralization may be inflexible to local conditions and unable to adapt to changing conditions. Further, high centralization may lead to waste. For example, using a highly centralized system to provide adequate resources to the rooms that require it may result in resources being sent to rooms that do not require the same amount of resources. Energy is wasted where resources are provided to areas that do not require such resources.

In contrast, a highly localized facilities control solution presents different disadvantages, such as in the ability to maintain and operate the facilities system. An example of a highly localized control solution is an individual light switch for a light or a group of lights in a particular location. Separate light switches may be distributed throughout a building, floor, etc., and each switch must be separately switched on for its associated device, or group of devices, to be activated. For some areas, this process may be extremely time-consuming. Additionally, separate switches may lead to energy waste when area occupants forget or neglect to switch off each individual switch.

There is, therefore, a need in the art for improved management and control of facilities systems.

SUMMARY OF THE INVENTION

Exemplary systems, methods, and apparatuses of the present invention provide for distributed intelligence in lighting control. A lighting facilities system may be organized into control areas, each of which may include one or more lighting devices. Each lighting control area is associated with a control apparatus, which controls the operation of the lighting devices within the lighting control area based on various types of signal information. Signal information may include information concerning local conditions or environments, as well as information from a centralized control server. In some embodiments, the control apparatus may reference actuation logic in determining operation instructions.

Various embodiments of the present invention include methods for distributed intelligence in lighting control. A method may include receiving signal information concerning a lighting control area in a lighting facilities system with multiple lighting control areas, determining instructions for operation of the lighting control area, and controlling operation of the lighting control area based on the determined instructions. The signal information may include such factors as switching input, centralized control input, schedules, environmental conditions, and the like. Further, in some embodiments, such signal information may be considered and the instructions may be determined by reference to rule-based actuation logic. The method may also include monitoring operation of the control area, detecting any fault states, and predicting when the control area may fail.

In some embodiments, the present invention may include an apparatus for distributed intelligence in lighting control. Associated with a lighting control area, an exemplary apparatus may include a communication interface for receiving various types of signal information, a processor for determining operation instructions, and a controller for controlling operation of the lighting control area based on the operation instructions. Various embodiments may further include timers, schedules, and various sensors, including light sensors, motion sensors, and the like.

Various embodiments of the present invention include systems for distributed intelligence in lighting control. An exemplary system may include multiple lighting control areas. Each lighting control area may be configured to receive signal information, determine operation instructions based on the signal information, and control operations by reference to the determined instructions. The exemplary system may further include a control server configured to provide certain signal information to the multiple control areas.

Some embodiments of the present invention include computer media and instructions for distributed intelligence in facilities control. Embodiments may further include instructions for monitoring operations and predicting failure of control areas in the facilities system.

DETAILED DESCRIPTION OF EXEMPLARY EMBODIMENTS

Embodiments of the present invention comprise systems, methods, and apparatuses for distributed intelligence in control of lighting systems. A facilities lighting system may be organized into multiple control areas. A control area can include a component device or series of component devices in the facilities system. In a lighting system, for example, a control area can include a single light fixture or a group of light fixtures. Each control area is associated with an actuation control apparatus, which determines instructions for the operation of each control area based on various types of signal information and controls operation of the control area based on the determined instructions.

Figure 1:
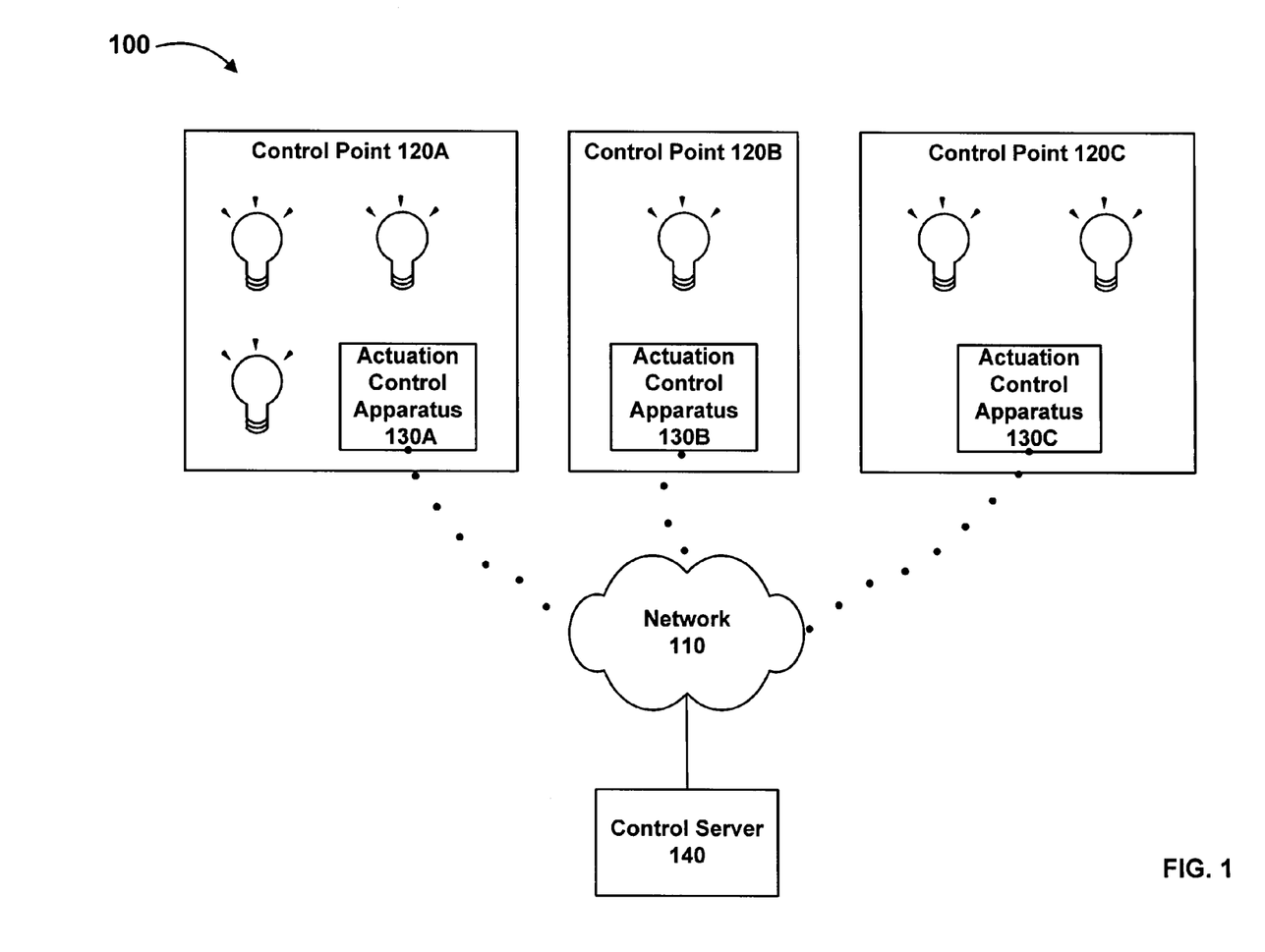
FIG. 1 illustrates an exemplary implementation of an environment providing distributed intelligence in facilities control.

FIG. 1 illustrates an exemplary implementation of an environment 100 providing distributed intelligence in facilities control. Implemented on a communications network 110, environment 100 may include multiple actuation control apparatuses 130A-130C, and a control server 140. Each of the control apparatuses 130A-C may be associated with a control area (e.g., 120A-120C, respectively). In some embodiments of the present invention, the network 110 may also allow for the control server 140 to send and receive information from various user devices.

The network 110 may be a local, proprietary network (e.g., intranet) and/or may be a part of a larger wide-area network. For example, the network 110 may be a local area network (LAN), which may also be communicatively coupled to a wide area network (WAN) such as the Internet. In some embodiments, the network 110 may be configured to transmit various electromagnetic waves, including, for example, radio signals. Examples of the network 110 may include IEEE 802.11 (Wi-Fi or Wireless LAN) networks, IEEE 802.16 (WiMAX) networks, IEEE 802.16c networks, and the like. Network 110 allows for communication between the various components of environment 100.

The control areas 120A-C may comprise a component device or a series of component devices in a facilities system. For example, as illustrated by FIG. 1, the control area 120A includes three lighting devices; the control area 120B includes one lighting device; and the control area 120C includes two lighting devices. A control area may also be defined as some or all devices in a room, on a floor, in a building, and so forth, based on a desired level of granularity. In various embodiments of the present invention, the component devices in a control area 120 may be in close proximity to each other, share similar environmental conditions, etc. Organizing a facilities system into the control areas 120A-C allows for local, distributed management of local devices. The organization further allows for robustness within the environment 100, because the effects of a hardware, software, or communication failure may be contained locally to one of the control areas 120.

Each control area 120A-C may be associated with their respective actuation control apparatus 130A-C. The actuation control apparatus (e.g., 130A) may be embedded in a device (e.g., a light fixture) of the control area (e.g., control area 120A), housed within a ballast (e.g., a ballast associated with the light fixtures of the control area 120A), in a separate device, or the like. Described in further detail with respect to FIG. 3, the actuation control apparatus 130 controls the operation of the device or devices in the control area 120 based on various types of signal information, including signal information sent over the network 110 from the control server 140. Associating each control area 120 with a separate actuation control apparatus 130 allows for granular and autonomous control, while still allowing for centralized control, for example, from the control server 140. In some embodiments of the present invention, the control area 120 may gather, store, generate, and/or transmit information concerning the operation of the devices in the control area 120. Such information may include power usage, energy consumption, equipment status, fault detection, predictions concerning fault states, and the like.

The control server 140 may comprise any combination of computer hardware and software configured to receive and transmit information to actuation control apparatuses (e.g., actuation control apparatuses 130A-C) concerning operation of their control areas (e.g., control areas 120A-C) in a facilities system. The control server 140 may be, for example, an enterprise server, such as that found in any number of corporate entities and businesses.

In some embodiments, control server 140 may be used to designate default settings and/or customize various settings for each of the actuation control apparatuses 130. For example, control server 140 may receive schedule information from a building manager and transmit the information to one or more of the actuation control apparatuses 130 in the facilities system. Each actuation control apparatus 130 may be sent the same information, different information, or a combination of same and different information. For example, each actuation control apparatus 130 may receive slightly different schedules of operation. Other types of information sent to the actuation control apparatuses may include operation instructions, signal information, updated information, etc. In some embodiments, the control server 140 may also receive information from the various control areas 120 concerning the operation of each respective control area 120. Such information may be reported to a building manager, for example. The information may further be used as input data in other devices.

Figure 2:
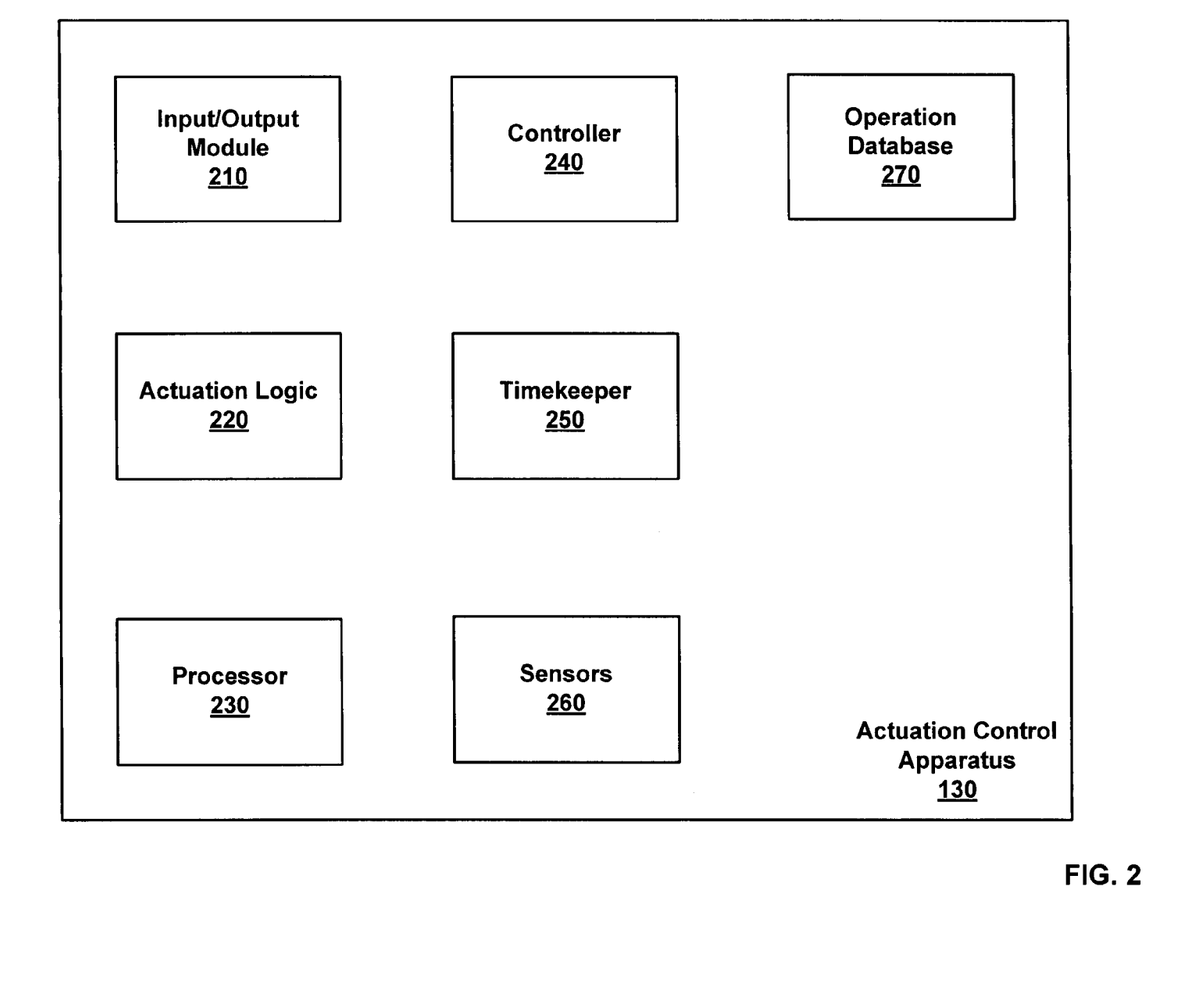
FIG. 2 illustrates an exemplary actuation control apparatus for providing distributed intelligence in facilities control.

FIG. 2 illustrates the exemplary actuation control apparatus 130 for providing distributed intelligence in facilities control. The actuation control apparatus 130 may include an input/output module 210, actuation logic 220, processor 230, controller 240, timekeeper 250, and sensors 260. Alternative embodiments may comprise more, less, or functionally equivalent components and still be within the scope of the exemplary embodiments.

A module may be any collection of routines that perform various system-level functions and may be dynamically loaded and unloaded by hardware and device drivers as required. The modular software components described herein may also be incorporated as part of a larger software platform or integrated as part of an application specific component.

The input/output module 210 may comprise any of a variety of hardware and/or software components configured to provide a communications interface capable of receiving various types of information from various sources. For example, the input/output module 210 may include various interfaces, devices, and/or antenna for receiving information wirelessly through network 110, and so forth. The information received may include switching information, schedule information, sensor information, information from the control server 140 (FIG. 1), and the like. Users may communicate signal information to the input/output module 210 through switches, as well as through computer-based or web-based interfaces in communication with control server 140.

The input/output module 210 may be further configured to transmit information, such as operation information, status information, prediction information, etc. For example, a report concerning the operation of the devices within the control area 120 associated with the actuation control apparatus 130 may be sent to a building manager or building maintenance staff. Reports may also be sent to a database (e.g., operation database 270) for storage, to various analysis engines for analysis, and so forth.

The exemplary actuation logic 220 may be configured to store and provide guidelines for responding to various types of signal information. For example, the actuation logic 220 may comprise a guideline concerning tasks to be performed at a particular time of day. Specifically, a guideline may direct that at 7:00 am, the lighting devices associated with control area 120 are switched on and the light from the lighting devices increased to 100% lighting capacity, if not already on and at 100%. Another guideline may direct that at 10:00 am, the light of the lighting devices should be dimmed to 70% of full lighting capacity.

In another example, actuation logic 220 may include a guideline concerning one or more tasks to be performed in response to a certain level of light. Using the above example, if the level of light at 10:00 am falls below a predefined level, the guideline may direct that the lighting devices may not be dimmed to 70% lighting capacity. Yet another guideline may direct that a certain level of light may trigger one task during a weekday and a different task during the weekend. Actuation logic 220 may be rule-based, algorithmic, a combination of the foregoing, etc. Depending on the type of facilities system, area requirements, occupant requirements, etc., the actuation logic 220 may provide default guidelines for responses to the particular signal information received. In some embodiments, actuation logic 220 may be customized and/or updated by information received by input/output module 210 through control server 140 (FIG. 1) from a user, such as a building manager, system administrator, etc., to reflect new area requirements, new user requirements, and so forth.

In exemplary embodiments, the processor 230 uses the signal information received by the input/output module 210 and the guidelines provided by the actuation logic 220 to determine operation instructions for the devices of the control area 120. For example, the input/output module 210 may receive signal information concerning a level of light detected in an area by one or more of the sensors 260 (described below). The processor 230 may then consult the guidelines provided by the actuation logic 220 to determine how to respond to such signal information. For example, the processor 230 may determine, based on the guidelines provided by the actuation logic 220, that the particular level of light is associated with a particular task, such as turning off one or more lighting fixtures of the control area 120A.

Having determined the task or tasks to be performed, then processor 230 can then relay operation instructions associated with the task or tasks to the controller 240. The controller 240 is configured to control the operation of the devices of control area 120. Depending on the type of facilities system, the controller 240 can turn the devices of the control area 120 on and off, adjust operation (e.g., dimming lights), and the like.

In some embodiments of the present invention, the timekeeper 250 may be included in the actuation control apparatus 130, or the timekeeper 250 may be included in a separate device associated with the actuation control apparatus 130. In exemplary embodiments, the timekeeper 250 keeps track of and provides signal information concerning dates, times, schedules, etc. to the other components of the actuation control apparatus 130A. Thus, the timekeeper 250 may trigger an operation based on a schedule. The timekeeper 250 may further be used to keep track of holidays and any special schedules of operations associated with certain holidays. For example, a particular holiday may trigger decreased lighting in unoccupied offices. Alternatively, a holiday may trigger a holiday-specific lighting display, including colored lights and/or lighting control areas configured in various shapes. In some embodiments, the timekeeper 250 may provide information concerning the time elapsed between certain events.

For example, the timekeeper 250 can provide information to the operations database 270 (described below) concerning the life of a lighting fixture (i.e., when a light bulb is installed and when the light bulb fails).

The sensors 260 may include any of a variety of sensors with the ability to detect a variety of conditional and/or environmental information, including occupancy, motion, sound, vibration, light, loss of radio communication, power usage, etc. The types of sensors 260 included in the actuation control apparatus 130 may vary depending on requirements of the area, requirements of the facilities system, etc. For example, a particular security system may incorporate motion sensors, but not light sensors.

In some embodiments, the sensors 260 may be embedded in the actuation control apparatus 130A, housed in a separate device, or the like. Upon sensing the conditional or environmental information, the sensors 260 can provide signal information to the input/output module 210. The sensors 260 may further allow for the operation of the control area 120 to be responsive to its local environment. For example, the sensors 260 may detect changing levels of natural sunlight in a room throughout a day. That information may be provided to the processor 230, which can then generate instructions for adjusting the level of lamp light in that room proportionately with the loss of sunlight so that the room may be provided with a consistent level of light. In some embodiments of the present invention, information concerning the operational state of the sensors (e.g., failure in communication) may also be used, in conjunction with actuation logic 220, to determine the operational state of a control area, the system, and/or to generate instructions.

The actuation control apparatus 130A optionally may comprise an operations database 270 for storing information concerning the operations of the devices of the control area 120. Such operation information may include measurements of current, voltage, power and energy consumption, equipment status, operating hours, etc. Some of the operation information (e.g., operating hours) may be received from the timekeeper 250 and/or the sensors 260. In some embodiments, the information may be processed to determine a minimum, maximum, averages, etc., which may also be stored in the operations database 270. Such information may be communicated to the network 110 for reporting. The information may also be used as input data for various algorithms, such as an algorithm for determining a fault state in a lighting fixture or ballast based on the characteristics of an electric load. A fault state in a lighting device, for example, may include a failed light bulb, etc. that may result in the device being inoperable. In various embodiments, such information concerning the electric load may be provided to the control server 140 for determination of fault states. Alternatively, the information may be provided to the processor 230 for determining a fault state. The processor 230 may further provide the information concerning the fault state to the operations database 270 for storage. Further, the operations database 270 may provide information concerning the number of actuations and operating hours for a lighting fixture of the control area 120, for example. When the number of actuations or operating hours accumulates to a certain level, the life of the lighting fixture or other device may be close to expiry.

Figure 3:
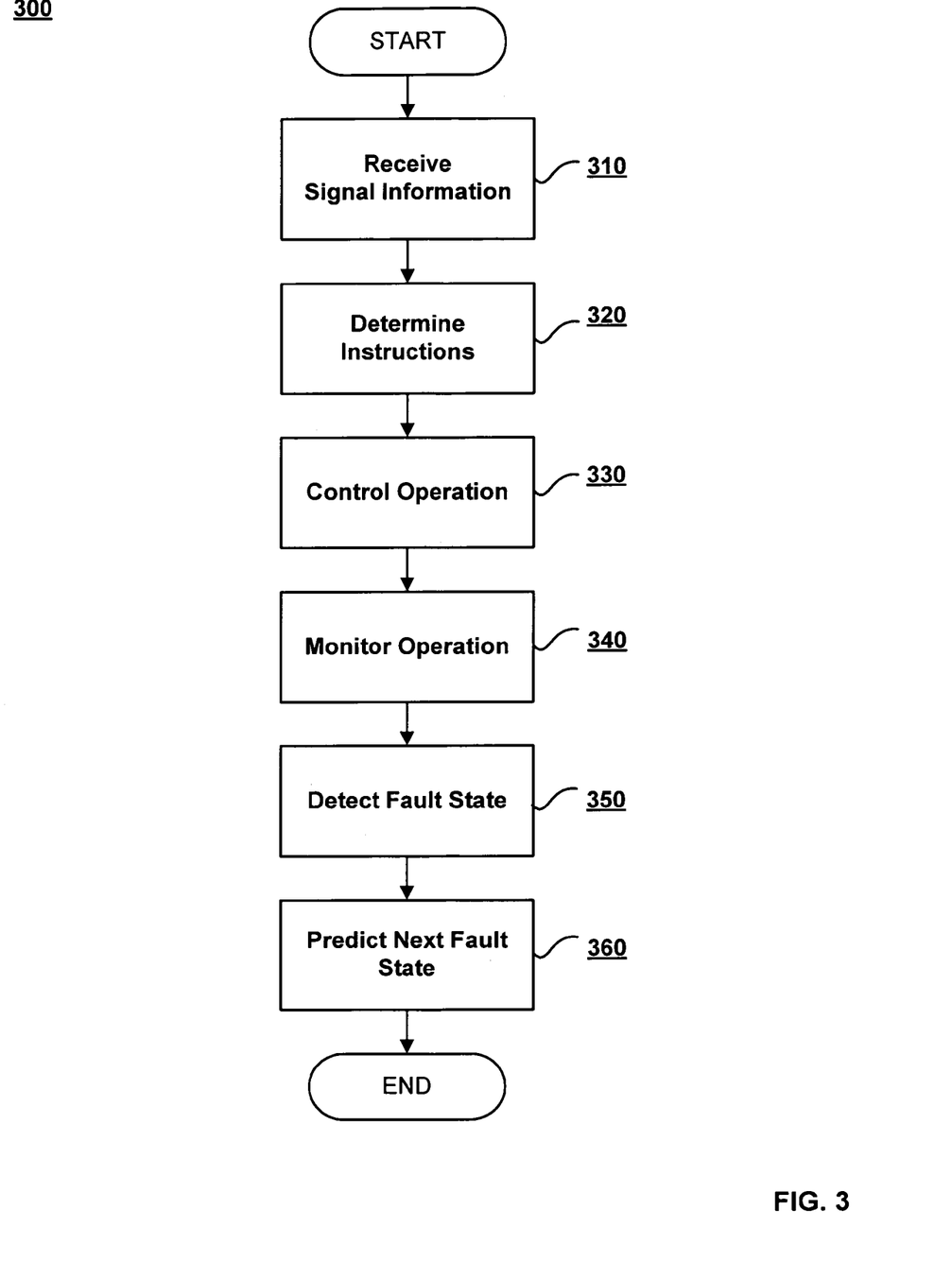
FIG. 3 is a flowchart depicting an exemplary method for providing distributed intelligence in facilities control.

FIG. 3 is a flowchart depicting an exemplary method 300 for providing distributed intelligence in facilities control. In this method, signal information is received at a control area 120, operation instructions for the control area 120 are determined, and the control area 120 is operated according to the instructions. In some embodiments of the present invention, the operation of the control area 120 may be monitored, and a fault state in the control area 120 may be detected. Further, predictions concerning future fault states may be made based on operation information.

In step 310, signal information is received by the input/output module 210. The signal information may come from various sources, including user input through switches, user input through computer-based or web-based interfaces in communication with the control server 140, the timekeeper 250, the sensors 260, a combination of the foregoing, and so forth. For example, the timekeeper 250 may provide signal information concerning a time of day. Alternatively, the sensors 260 may sense motion in a particular area and communicate signal information concerning the sensed motion to the input/output module 210.

In step 320, operation instructions are determined. Consulting the actuation logic 220, the processor 230 may determine what task or tasks are associated with the signal information received by the input/output module 210. For example, signal information concerning motion as detected by one of the motion sensor 260 is received. The processor 230 may access the actuation logic 220 for guidelines in responding to the signal information. The appropriate guidelines, as provided by the actuation logic 220, may indicate that motion at a certain time in a certain area is associated with a particular task or set of tasks, such as sounding a security alarm or set of security alarms. Subsequently, the processor 230 determines the operation instructions for the indicated tasks and relays the instructions to the controller 240.

In step 330, operations of the control area 120 are controlled according to the instructions. In an exemplary embodiment, the controller 240 receives the operation instructions and controls the operation of the devices of the control area 120. For example, the controller 240 may receive instructions for sounding the security alarm associated with the control area 120 and then control operation of the security alarm according to the received instructions.

In an optional step 340, operations of the control area 120 may be monitored. Various information, including current, voltage, power, energy consumption, information from the timekeeper 250, information from the sensors 260, etc., may be stored in the operations database 270. Such information may be processed and reported to various parties, including occupants, building managers, other devices, and so forth.

In an optional step 350, a fault state in the control area 120 may be detected. Variations in power usage, energy usage, electrical load, etc., may indicate a fault state in one or more devices of the control area 120. Such determinations may be based on the information stored in the operations database 270. In some embodiments, the fault state may be reported to occupants, building managers, etc. through the network 110.

In an optional step 360, a prediction is made concerning a possible future fault state. Information from the operations database 270 may be used to estimate or predict a lifespan for the one or more devices of the control area 120. Such information may also be reported to occupants, building managers, etc. through the network 110.

Some of the above-described functions can be composed of instructions that are stored on storage media (e.g., computer-readable medium). The instructions may be retrieved and executed by the processor 230. Some examples of storage media are memory devices, tapes, disks, integrated circuits, and servers. The instructions are operational when executed by the processor 230 to direct the processor 230 to operate in accord with the invention. Those skilled in the art are familiar with instructions, processor(s), and storage media.

It is noteworthy that any hardware platform suitable for performing the processing described herein is suitable for use with the invention. The terms "computer-readable medium" and "computer-readable media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, punch cards, paper tape, any other physical medium with patterns of marks or holes, a RAM, a PROM, an EPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

While the present invention has been described in connection with a series of preferred embodiment, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method for distributed intelligence in facility lighting control, the method comprising:
   storing in memory of a control device a set of guidelines, each guideline indicating one or more tasks to be performed in response to a set of conditions;
   receiving signal information sent over a communication network to the control device, the signal information concerning a lighting control area in a facilities system comprising a plurality of control areas, the lighting control area comprising one or more lighting devices under control of the control device, the signal information including an environmental condition that may impact a measurement of power usage at the control device;
   executing instructions stored in memory, wherein execution of the instructions by a processor of the control device determines a response to the received signal information, wherein the determination of the response includes:
consulting the set of guidelines stored in memory,
identifying a present condition, the present condition not included in the signal information sent over the communication network, where the present condition may be determined based on one of date, time of day, and schedule,
identifying one or more tasks associated with a set of conditions comprising the environmental condition that may impact the measurement of power usage as indicated by the signal information and the identified present condition, the identification of the one or more tasks based on the set of guidelines; and
directing performance of the one or more tasks identified based on the set of guidelines, wherein performance of the one or more tasks includes adjusting load of the one or more lighting devices within the control area.

2. The method of claim 1, wherein the signal information further comprises information based on the environmental condition.

3. The method of claim 1, wherein the set of guidelines comprises rule-based actuation logic.

4. The method of claim 1, where the signal information further comprises information based on the presence of occupants in the lighting control area.

5. The method of claim 1, wherein the signal information further comprises information designated by a user.

6. The method of claim 1, wherein the signal information further comprises information from a control server.

7. The method of claim 1, further comprising receiving an update to the set of guidelines, the update being sent over the communication network to the control device, and automatically updating the set of guidelines stored in memory in accordance with the received update, wherein identification of the one or more tasks is based on the updated set of guidelines.

8. The method of claim 1, wherein the one or more tasks includes monitoring operation of the lighting control area.

9. The method of claim 8, wherein monitoring operation of the control area further comprises detecting a fault state in one of the lighting devices in the lighting control area.

10. The method of claim 9, wherein detecting a fault state in one of the lighting devices in the lighting control area is based on characteristics of an electrical load of the lighting device, the characteristics of the electrical load being identified based on analysis of the operation information regarding the monitored lighting control area.

11. The method of claim 8, wherein monitoring operation of the lighting control area further comprises predicting failure in one of the lighting devices in the lighting control area, the prediction based on at least operation information regarding the monitored lighting control area.

12. The method of claim 8, wherein monitoring operation of the lighting control area further comprises storing operation information associated with the lighting control area.

13. The method of claim 8, further comprising:
storing operation information regarding the monitored lighting control area, the operation information being stored in memory of the control device;
processing the operation information to determine a metric based on a number of operating hours, the metric selected from the group consisting of minimum, maximum, and average power usage; and
storing the determined metric in memory of the control device.

14. An apparatus for distributed intelligence in facility lighting control, the apparatus comprising:
a memory configured to store a set of guidelines, each guideline indicating one or more tasks to be performed in response to a set of conditions;
a communication interface configured to receive signal information sent over a communication network, the signal information concerning a lighting control area in a facilities system comprising a plurality of control areas, the signal information including an environmental condition that may impact a measurement of power usage at the control device;
a processor configured to execute instructions stored in memory, wherein execution of the instructions by a processor determines a response to the received signal information, wherein the determination of the response includes
consulting the set of guidelines stored in memory,
identifying a present condition, the present condition not included in the signal information sent over the communication network, where the present condition may be determined based on one of date, time of day, and schedule,
identifying one or more tasks associated with a set of conditions comprising the environmental condition that may impact the measurement of power usage as indicated by the signal information and the identified present condition, the identification of the one or more tasks based on the set of guidelines; and
a controller configured to adjust load of one or more lighting devices within the lighting control area in accordance with the one or more identified tasks.

15. The apparatus of claim 14, wherein the communication interface is further configured to receive signal information sent over the communication network from a motion sensor configured to provide signal information concerning presence of an occupant.

16. The apparatus of claim 14, wherein the communication interface is further configured to receive signal information sent over the communication network from a control server.

17. The apparatus of claim 14, further comprising a timekeeper configured to identify the present condition as determined based on one of date, time of day, and schedule.

18. The apparatus of claim 14, wherein the communication interface is further configured to receive signal information sent over the communication network from a light sensor configured to provide signal information based on a level of light.

19. A non-transitory computer-readable storage medium having stored thereupon executable computing instructions for performing a method comprising:
storing a set of guidelines, each guideline indicating one or more tasks to be performed in response to a set of conditions;
receiving signal information concerning a lighting control area in a facilities system comprising a plurality of control areas, the lighting control area comprising one or more lighting devices under control of the control device, the signal information including an environmental condition that may impact a measurement of power usage at the control device;
determining a response to the received signal information, wherein the determination of the response includes:
consulting the set of guidelines stored in memory,
identifying present condition, the present condition not included in the signal information sent over the communication network, where the present condition may be determined based on one of date, time of day, and schedule, identifying one or more tasks associated with a set of conditions comprising the environmental condition that may impact the measurement of power usage as indicated by the signal information and the identified present condition, the identification of the one or more tasks based on the set of guidelines; and directing performance of the one or more tasks identified based on the set of guidelines, wherein performance of the one or more tasks includes adjusting load of the one or more lighting devices within the control area.

20. The non-transitory computer-readable storage medium of claim 19, wherein the executable instructions further provide for monitoring operation of the lighting control area.

21. The non-transitory computer-readable storage medium of claim 19, wherein monitoring operation of the control area further comprises predicting failure of the lighting control area based on at least operation information.

22. A method for distributed intelligence in facility lighting control, the method comprising:

storing in memory of a control device a set of rules, each rule indicating one or more tasks to be performed in response to a set of conditions;

receiving signal information sent over a communication network to the control device, the signal information concerning a lighting control area in a facilities system comprising a plurality of control areas, the lighting control area comprising one or more lighting devices under control of the control device, the signal information including an environmental condition that may impact a measurement of power usage at the control device;

executing instructions stored in memory, wherein execution of the instructions by a processor of the control device determines a response to the received signal information, wherein the determination of the response includes:

consulting the set of rules stored in memory, identifying a present condition, the present condition not included in the signal information sent over the communication network, where the present condition may be determined based on one of date, time of day, and schedule, identifying one or more tasks associated with a set of conditions comprising the environmental condition that may impact the measurement of power usage as indicated by the signal information and the identified present condition, the identification of the one or more tasks based on the set of rules; and directing performance of the one or more tasks identified based on the set of rules, wherein performance of the one or more tasks includes adjusting load of the one or more lighting devices within the control area.

23. A method for distributed intelligence in facility lighting control, the method comprising:

storing in memory of a control device a set of guidelines, each guideline indicating one or more tasks to be performed in response to a set of conditions;

receiving signal information sent over a communication network to the control device, the signal information concerning a lighting control area in a facilities system comprising a plurality of control areas, the lighting control area comprising one or more lighting devices under control of the control device;

executing instructions stored in memory, wherein execution of the instructions by a processor of the control device determines a response to the received signal information, wherein the determination of the response includes:

consulting the set of guidelines stored in memory, identifying a present condition, the present condition not included in the signal information sent over the communication network, where the present condition may be determined based on one of date, time of day, and schedule, identifying one or more tasks associated with a set of conditions comprising the environmental condition that may impact the measurement of power usage as indicated by the signal information and the identified present condition, the identification of the one or more tasks based on the set of guidelines; and directing performance of the one or more tasks identified based on the set of guidelines, wherein performance of the one or more tasks includes adjusting load of the one or more lighting devices within the control area.

* * * * *